(12) United States Patent
Yagihashi (10) Patent No.: US 8,238,856 B2
(45) Date of Patent: Aug. 7, 2012

(54) WIRELESS COMMUNICATING APPARATUS, RECEIVING METHOD SELECTING METHOD, AND RECEIVING METHOD SELECTING PROGRAM

(75) Inventor: Ayumu Yagihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 938 days.

(21) Appl. No.: 12/281,667

(22) PCT Filed: Feb. 28, 2007

(86) PCT No.: PCT/JP2007/053749
§ 371 (c)(1),
(2), (4) Date: Sep. 4, 2008

(87) PCT Pub. No.: WO2007/105488
PCT Pub. Date: Sep. 20, 2007

(65) Prior Publication Data
US 2009/0191829 A1    Jul. 30, 2009

(30) Foreign Application Priority Data
Mar. 14, 2006 (JP) .................... 2006-069984

(51) Int. Cl.
*H04B 7/08* (2006.01)
(52) U.S. Cl. ......... 455/132; 455/296; 455/303; 375/346
(58) Field of Classification Search .............. 455/63.1, 455/131–135, 161.1–161.3, 296–298, 303; 375/346–349
See application file for complete search history.

(56) References Cited

U.S. PATENT DOCUMENTS

| | | | |
|---|---|---|---|
| 2004/0167758 A1 * | 8/2004 | Takiishi et al. | 703/2 |
| 2004/0198296 A1 * | 10/2004 | Hui et al. | 455/296 |
| 2007/0183483 A1 * | 8/2007 | Narayan et al. | 375/148 |
| 2007/0189242 A1 * | 8/2007 | Hosokawa et al. | 370/338 |

FOREIGN PATENT DOCUMENTS

| | | |
|---|---|---|
| JP | 2004159284 A | 6/2004 |
| JP | 2005303952 A | 10/2005 |

OTHER PUBLICATIONS

International Search Report for PCT/JP2007/053749 mailed Apr. 10, 2007.

* cited by examiner

*Primary Examiner* — Nhan Le (57) ABSTRACT

A wireless communicating apparatus is provided which includes two receiving methods, and can determine a favorable receiving method. The wireless communicating apparatus executes, which is provided with the two receiving methods of a first receiving method which is used in a propagation path environment in which it is necessary to reduce the multi-path interference, and a second receiving method which is used in the propagation path environment in which it is not necessary to reduce the multi-path interference, a first determination (step S1) for determining whether or not the fluctuation in time for the path is less than a predetermined threshold, and a second determination (step S2) for determining whether or not the number of the paths is less than a predetermined threshold, and determines (step S3, 4) to use which receiving method of the first receiving method or the second receiving method to communicate via wireless according to a first determination result and a second determination result.

19 Claims, 4 Drawing Sheets

WIRELESS COMMUNICATING APPARATUS, RECEIVING METHOD SELECTING METHOD, AND RECEIVING METHOD SELECTING PROGRAM

TECHNICAL FIELD

The present invention relates to a wireless communicating apparatus such as a portable phone, particularly, to a wireless communicating apparatus which is provided with a plurality of receiving methods and can communicate via wireless by using a preferable receiving method, and a receiving method selecting method and a receiving method selecting program in the wireless communicating apparatus provided.

BACKGROUND ART

In the W-CDMA (Wide band Code Division Multiple Access) communicating system which is compliant with the 3GPP (3rd Generation Partnership Project) which is currently being standardized, the HSDPA (High Speed Downlink Packet Access) has been proposed as a technique for realizing a high speed down link.

Meanwhile, since the receiving quality of received data, whose encoding ratio is high like the HSDPA, is easily influenced by a multi-path interference, it is necessary to provide the wireless communicating apparatus realizing the HSDPA with an interference canceller which can reduce the multi-path interference.

However, the interference canceller includes such a disadvantage that the ability can not be realized depending on a propagation channel condition, and also includes such a weak point that the decoding quality becomes worse than that of the conventional receiving method, in which the interference canceller is not used, depending on the propagation channel condition.

From the above description, it is necessary to communicate via wireless as separating, depending on an electric wave channel condition, a receiving method, such as the interference canceller, which needs to reduce the multi-path interference, a receiving method which does not need to reduce the multi-path interference without using the interference canceller, and the like.

Meanwhile, there exists a patent document which has been applied before the present invention, and discloses a wireless communicating apparatus which includes estimating means for estimating a signal propagation environment, and selecting means for selecting a signal receiving method according to the estimated propagation environment from the two or more receiving methods including at least the liner equalization, and enables the total system throughput to be improved (for example, refer to Patent Document 1).

There exists a document disclosing a geometry measuring method which is a geometry measuring method used by a wireless receiving apparatus in a wireless communicating system in a cellular method, includes a interfered signal electric power measuring step for measuring the electric power of an interfered signal included in a received signal for each path, an adding step for adding N paths of the interfered signal electric power measured for each path, a path excluded interfered signal electric power level measuring step for measuring the electric power of the interfered signal, which is not influenced by the path, but is included in the received signal, an own cell interfered signal electric power calculating step for calculating own cell interfered signal electric power by subtracting the adding result at the adding step from a value obtained by N-multiplying the measured path excluded interfered signal electric power, other cell interfered signal/noise electric power calculating step for calculating an added value of the electric power of an other cell interfered signal and a noise by subtracting the calculated own cell interfered signal electric power from the measured path excluded interfered signal electric power, and a geometry calculating step for calculating the geometry by dividing the calculated own cell interfered signal electric power by the calculated added value of the electric power of the other cell interfered signal and the noise, and can conveniently generate the geometry under the propagation environment in which the multi-path is formed, in which it can be easily determined whether to RAKE-receive the received signal, or to adaptively-receive the received signal by using an adaptive equalizer, the interference canceller, and the like in the wireless receiving apparatus (for example, refer to Patent Document 2).

Patent Document 1: Japanese Patent Laid Open Publication No. 2004-159284

Patent Document 2: Japanese Patent Laid Open Publication No. 2005-303952

DISCLOSURE OF INVENTION

Problem to be Solved by the Invention

Meanwhile, while the above Patent Document 1 discloses the wireless communicating apparatus which includes the selecting means for selecting the signal receiving method according to the estimated propagation environment, and enables the total system throughput to be improved, the above Patent Document 1 does not clearly describe that the preferable receiving method is determined according to a plurality of determination results for the path.

While the Patent Document 2 discloses the geometry measuring method which can conveniently generate the geometry under the propagation environment in which the multi-path is formed, in which it can be easily determined whether to RAKE-receive the received signal, or to adaptively-receive the received signal by using an adaptive equalizer, the interference canceller, and the like in the wireless receiving apparatus, the above Patent Document 2 does not clearly describe that the preferable receiving method is determined according to the plurality of determination results for the path.

The present invention has been made in consideration of the above circumstance, and an object of the present invention is to provide the wireless communicating apparatus, the receiving method selecting method, and the receiving method selecting program which can determine the preferable receiving method according to the plurality of determination results for the path in the wireless communicating apparatus provided with the two receiving methods of the receiving method which needs to reduce the multi-path interference, and the receiving method which does not need to reduce the multi-path interference.

Means for Solving the Problems

It is assumed that the present invention includes the following features to achieve such an object.

The wireless communicating apparatus according to the present invention is the wireless communicating apparatus, provided with two receiving methods of a first receiving method that is used in a propagation path environment in which it is necessary to reduce multi-path interference, and a second receiving method that is used in a propagation path environment in which it is not necessary to reduce the multi-path interference, characterized by including a first determining unit that determines whether or not fluctuation in time for the path is less than a predetermined threshold, a second determining unit that determines whether or not the number of the paths is less than a predetermined threshold, and a receiving method determining unit that determines which receiving method of the first receiving method or the second receiving method is to be used to communicate via wireless according to a determination result by the first determining unit and a determination result by the second determining unit.

The wireless communicating apparatus according to the present invention is characterized in that when the determination result by the first determining unit is a determination result that the fluctuation in time for the path is less than the predetermined threshold, and the determination result by the second determining unit is a determination result that the number of the paths is less than the predetermined threshold, the receiving method determining unit communicates via wireless by using the first receiving method The wireless communicating apparatus according to the present invention is characterized in that when the determination result by the first determining unit is a determination result that the fluctuation in time for the path is equal to or more than the predetermined threshold, or when the determination result by the first determining unit is a determination result that the fluctuation in time for the path is less than the predetermined threshold, and the determination result by the second determining unit is a determination result that the number of the paths is equal to or more than the predetermined threshold, the receiving method determining unit communicates via wireless by using the second receiving method.

The wireless communicating apparatus according to the present invention is characterized by including a third determining unit that determines whether or not a ratio of a noise to the received signal is less than a predetermined threshold, wherein, when a determination result by the third determining unit is a determination result that the ratio of the noise to the received signal is less than the predetermined threshold, the receiving method determining unit communicates via wireless by using the first receiving method, when the determination result by the third determining unit is a determination result that the ratio of the noise to the received signal is equal to or more than the predetermined threshold, the receiving method determining unit communicates via wireless by using the second receiving method The wireless communicating apparatus according to the present invention is characterized in that the first receiving method is a receiving method that uses an interference canceller to reduce the multi-path interference, and the second receiving method is a receiving method that uses a lake receiver instead of the interference canceller.

The receiving method selecting method according to the present invention is a receiving method selecting method executed by the wireless communicating apparatus, provided with two receiving methods of a first receiving method that is used in a propagation path environment in which it is necessary to reduce multi-path interference, and a second receiving method that is used in a propagation path environment in which it is not necessary to reduce the multi-path interference, characterized in that the wireless communicating apparatus executes a first determining step for determining whether or not fluctuation in time for the path is less than a predetermined threshold, a second determining step for determining whether or not the number of the paths is less than a predetermined threshold, and a receiving method determining step for determining which receiving method of the first receiving method or the second receiving method is to be used to communicate via wireless according to a determination result by the first determining step and a determination result by the second determining step.

The receiving method selecting method according to the present invention is characterized in that when the determination result by the first determining step is a determination result that the fluctuation in time for the path is less than the predetermined threshold, and the determination result by the second determining step is a determination result that the number of the paths is less than the predetermined threshold, the receiving method determining step communicates via wireless by using the first receiving method The receiving method selecting method according to the present invention is characterized in that when the determination result by the first determining step is a determination result that the fluctuation in time for the path is equal to or more than the predetermined threshold, or when the determination result by the first determining step is a determination result that the fluctuation in time for the path is less than the predetermined threshold, and the determination result by the second determining step is a determination result that the number of the paths is equal to or more than the predetermined threshold, the receiving -method determining step communicates via wireless by using the second receiving method The receiving method selecting method according to the present invention is characterized in that the wireless communicating apparatus executes a third determining step for determining whether or not a ratio of a noise to a received signal is less than a predetermined threshold, wherein, when a determination result by the third determining step is a determination result that the ratio of the noise to the received signal is less than the predetermined threshold, the receiving method determining step communicates via wireless by using the first receiving method, when the determination result by the third determining step is a determination result that the ratio of the noise to the received signal is equal to or more than the predetermined threshold, the receiving method determining step communicates via wireless by using the second receiving method.

The receiving method selecting method according to the present invention is characterized in that the first receiving method is a receiving method that uses an interference canceller to reduce the multi-path interference, and the second receiving method is a receiving method that uses a lake receiver instead of the interference canceller.

The receiving method selecting program according to the present invention is a receiving method selecting program causing the wireless communicating apparatus to execute, the wireless communicating apparatus being provided with two receiving methods of a first receiving method that is used in a propagation path environment in which it is necessary to reduce multi-path interference, and a second receiving method that is used in a propagation path environment in which it is not necessary to reduce the multi-path interference, a first determining process for determining whether or not fluctuation in time for the path is less than a predetermined threshold, a second determining process for determining whether or not the number of the paths is less than a predetermined threshold, and a receiving method determining process for determining which receiving method of the first receiving method or the second receiving method is to be used to communicate via wireless according to a determination result by the first determining process and a determination result by the second determining process.

The receiving method selecting program according to the present invention is characterized in that when a determination result by the first determining process is a determination result that the fluctuation in time for the path is less than the predetermined threshold, and the determination result by the second determining process is a determination result that the number of the paths is less than the predetermined threshold, the receiving method determining process communicates via wireless by using the first receiving method.

The receiving method selecting program according to the present invention is characterized in that when the determination result by the first determining process is a determination result that the fluctuation in time for the path is equal to or more than the predetermined threshold, or when the determination result by the first determining process is a determination result that the fluctuation in time for the path is less than the predetermined threshold, and the determination result by the second determining process is a determination result that the number of the paths is equal to or more than the predetermined threshold, the receiving method determining process communicates via wireless by using the second receiving method The receiving method selecting program according to the present invention is characterized by causing the wireless communicating apparatus to execute a third determining process for determining whether or not a ratio of a noise to a received signal is less than a predetermined threshold, wherein, when a determination result by the third determining process is a determination result that the ratio of the noise to the received signal is less than the predetermined threshold, the receiving method determining process communicates via wireless by using the first receiving method, when the determination result by the third determining process is a determination result that the ratio of the noise to the received signal is equal to or more than the predetermined threshold, the receiving method determining process communicates via wireless by using the second receiving method.

The receiving method selecting program according to the present invention is characterized in that the first receiving method is a receiving method that uses an interference canceller to reduce the multi-path interference, and the second receiving method is a receiving method that uses a lake receiver instead of the interference canceller.

Effect of the Invention

The present invention is characterized in that the wireless communicating apparatus, which is provided with the two receiving methods of the first receiving method which is used in the propagation path environment in which it is necessary to reduce the multi-path interference, and the second receiving method which is used in the propagation path environment in which it is not necessary to reduce the multi-path interference, executes a first determination for determining whether or not the fluctuation in time for the path is less than the predetermined threshold, and a second determination for determining whether or not the number of the paths is less than the predetermined threshold, and determines to use which receiving method of the first receiving method or the second receiving method to communicate via wireless according to determination results by the first determination and the second determination. Thereby, in the wireless communicating apparatus provided with the two receiving methods of the receiving method which needs to reduce the multi-path interference, and the receiving method which does not need to reduce the multi-path interference, it becomes possible to determine the preferable receiving method according to a plurality of determination results for the path.

BEST MODE FOR CARRYING OUT THE INVENTION

First, the features of the wireless communicating apparatus according to the present embodiment will be described as referring to FIG. 1.

The wireless communicating apparatus according to the present embodiment is the wireless communicating apparatus provided with the two receiving methods of the first receiving method which is used in the propagation path environment in which it is necessary to reduce the multi-path interference, and the second receiving method which is used in the propagation path environment in which it is not necessary to reduce the multi-path interference. The wireless communicating apparatus according to the present embodiment is characterized by executing a first determination (step S1) for determining whether or not the fluctuation in time for the path is less than the predetermined threshold, and a second determination (step S2) for determining whether or not the number of the paths is less than the predetermined threshold, and determining (step S3, 4) to use which receiving method of the first receiving method or the second receiving method to communicate via wireless according to the determination result by the first determination (step S1) and the determination result by the second determination (step S2). Thereby, in the wireless communicating apparatus provided with the two receiving methods of the receiving method which needs to reduce the multi-path interference, and the receiving method which does not need to reduce the multi-path interference, it becomes possible to determine the preferable receiving method according to a plurality of the determination results for the path. Hereinafter, the wireless communicating apparatus according to the present embodiment will be described as referring to the accompanied drawings.

[First Exemplary Embodiment]

Figure 2:
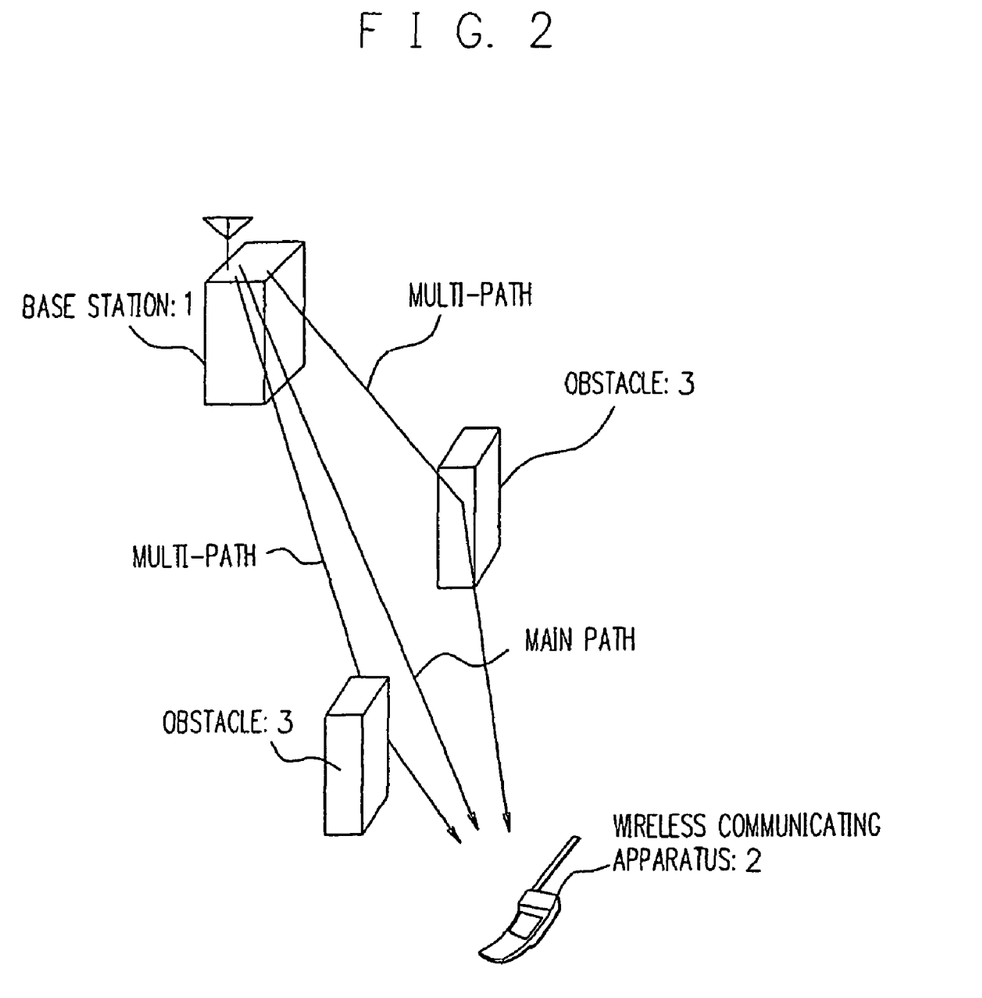
FIG. 2 is a diagram describing a multi-path interference.

First, the multi-path interference will be described as referring to FIG. 2.

When a wireless signal from a base station (1) reaches a wireless communicating apparatus (2) without being disturbed by a propagation channel, the number of a path, which means a road through which the wireless signal passes, ideally becomes one. Here, this is referred to as "main path". However, when the wireless signal from the base station (1) encounters an obstacle (3), and the like to reflect on the way of the propagation channel, a plurality of the paths result in reaching the wireless communicating apparatus (2). Such a path except the "main path" is referred to as "multi-path". It is generally considered that the receiving quality degradation of the "multi-path" is larger than that of the "main path" in the propagation channel of each path, and as compared with the "main path", as the distance becomes larger in time, the receiving quality is degraded more in the "multi-path". The influence to the receiving quality, which is provided by the "multi-path" as a noise component to a signal component of the "main path", is referred to as multi-path interference.

Meanwhile, since the receiving quality for received data, whose encoding ratio is high like the HSDPA, is easily influenced by the multi-path interference, it is necessary to provide the wireless communicating apparatus (2) realizing the HSDPA with an interference canceller which can reduce the multi-path interference.

However, the interference canceller includes such a disadvantage that the ability can not be realized enough depending on the propagation channel condition, and also includes such a weak point that the decoding quality becomes worse than that of the conventional receiving method, in which the interference canceller is not used, depending on the propagation channel condition.

Thus, the present inventor has tried a variety of improvements and has been dedicated in the research to solve the above problem, and as a result, the present inventor has developed the wireless communicating apparatus which is a wireless communicating apparatus provided with the interference canceller which is necessary to receive data whose encoding ratio is high like the HSDPA, and which can control so as to communicate via wireless by using the conventional receiving method when the propagation channel condition is a condition which is difficult for the interference canceller to process, and so as to communicate via wireless by using the interference canceller when the propagation channel condition is otherwise.

As described above, by controlling so as to communicate via wireless as separating the interference canceller and the conventional receiving method according to the electric wave condition, in the wireless communicating apparatus provided with the interference canceller which is necessary to receive data whose encoding ratio is high like the HSDPA, it becomes possible to obtain a favorable decoding quality which is not less than that of the conventional receiving method even under an environment of any propagation channel condition. Meanwhile, the conventional receiving method is, for example, the lake receiver, or the like. The interference canceller is, for example, a time domain equalizer, or the like.

Next, an internal configuration of the wireless communicating apparatus according to the present embodiment will be described as referring to FIG. 3.

The wireless communicating apparatus according to the present embodiment is configured with an antenna (101), an HSDPA receiver (102), a demodulation processing unit (103), and a decode processing unit (104). Meanwhile, the HSDPA receiver (102) is configured with a path search processing unit (1021), an HSDPA receiver controlling unit (1022), and a canceller processing unit (1023).

Meanwhile, a received signal received by the antenna (101) is converted to a received IQ signal, and the converted received IQ signal is inputted to the HSDPA receiver (102). An inverse diffusion process is applied to the converted received IQ signal by the HSDPA receiver (102), and the inverse diffusion-processed received IQ signal is outputted to the demodulation processing unit (103), and the decode processing unit (104).

Meanwhile, the path search processing unit (1021) estimates a propagation channel condition (distribution in time for the path, the number of the paths) and a path position based on the received IQ signal inputted in the HSDPA receiver (102), and outputs information on the estimated propagation channel condition and path position to the HSDPA receiver controlling unit (1022).

The HSDPA receiver controlling unit (1022) receives the information on the propagation channel condition and the path position inputted from the path search processing unit (1021), determines in an inverse diffusion mode whether to execute a canceller process or to process in the conventional receiving method based on the received propagation channel condition, and outputs information on the determination result in the inverse diffusion mode and the path position to the canceller processing unit (1023). The HSDPA receiver controlling unit (1022) sets information, which is necessary when the path search processing unit (1021) and the canceller processing unit (1023) are controlled to operate, in the path search processing unit (1021) and the canceller processing unit (1023).

The HSDPA receiver controlling unit (1022) controls to start, stop, and initialize the path search processing unit (1021) and the canceller processing unit (1023).

The canceller processing unit (1023) receives the information on the determination result in the inverse diffusion mode and the path position inputted from the HSDPA receiver controlling unit (1022), executes the canceller process or the process in the conventional receiving method for the received IQ signal inputted in the HSDPA receiver (102), and outputs the inverse diffusion-processed received IQ signal to the demodulation processing unit (103), and the decode processing unit (104).

Next, a control operation in the wireless communicating apparatus according to the present embodiment will be described as referring to FIG. 3.

First, when a control signal for starting the HSDPA communication is inputted, the HSDPA receiver controlling unit (1022) initializes the path search processing unit (1021) and the canceller processing unit (1023). Next, the HSDPA receiver controlling unit (1022) inputs a parameter value, which is necessary to control the HSDPA communication, in the path search processing unit (1021) and the canceller processing unit (1023), and starts the path search processing unit (1021) and the canceller processing unit (1023) at a appropriate timing respectively.

Meanwhile, when being started by the control from the HSDPA receiver controlling unit (1022), the path search processing unit (1021) estimates the propagation channel condition (distribution in time for the path, the number of the paths) and the path position based on the received IQ signal inputted in the HSDPA receiver (102), and outputs information on the estimated propagation channel condition and path position to the HSDPA receiver controlling unit (1022).

Meanwhile, the path search processing unit (1021) periodically estimates the propagation channel information and the path position based on the received IQ signal inputted in the HSDPA receiver (102), and outputs the information on the estimated propagation channel condition and path position to the HSDPA receiver controlling unit (1022).

Figure 1:
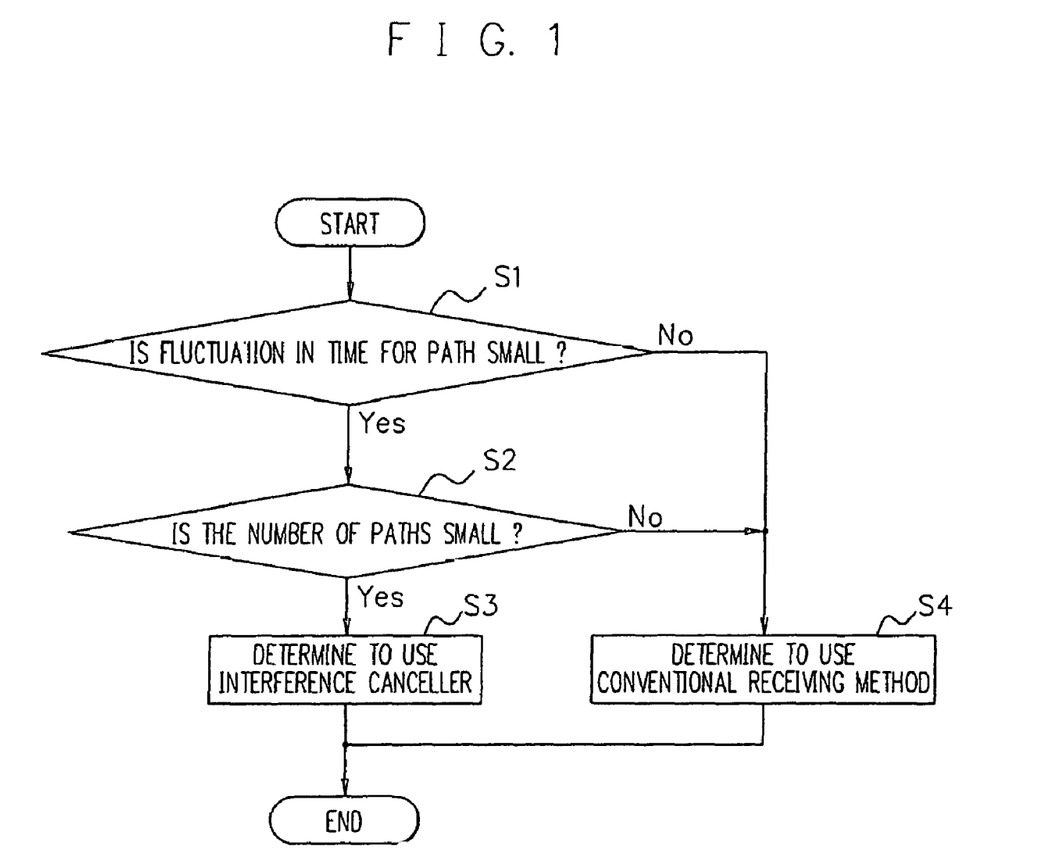
FIG. 1 is a flowchart illustrating a determining process in an inverse diffusion mode executed by a wireless communicating apparatus according to a first exeplary embodiment.

The HSDPA receiver controlling unit (1022) receives the information on the propagation channel condition and the path position inputted from the path search processing unit (1021), executes the determining process in the inverse diffusion mode illustrated in FIG. 1, and outputs the information on the determination result in the inverse diffusion mode and the path position to the canceller processing unit (1023).

Meanwhile, the HSDPA receiver controlling unit (1022) periodically executes the determining process in the inverse diffusion mode illustrated in FIG. 1 based on the propagation channel condition inputted from the path search processing unit (1021), and outputs the information on the determination result in the inverse diffusion mode and the path position to the canceller processing unit (1023).

The canceller processing unit (1023) executes the canceller process or the process of the conventional receiving method for the received IQ signal inputted in the HSDPA receiver (102) based on the information on the determination result in the inverse diffusion mode and the path position inputted from the HSDPA receiver controlling unit (1022), and outputs the inverse diffusion-processed received IQ signal to the demodulation processing unit (103) and the decode processing unit (104).

The demodulation processing unit (103) executes a demodulation process based on the received IQ signal inputted from the HSDPA receiver (102). The decode processing unit (104) executes a decode process based on the received IQ signal inputted from the HSDPA receiver (102).

Next, the determining process in the inverse diffusion mode executed by the HSDPA receiver controlling unit (1022) will be described as referring to FIG. 1. Meanwhile, since it is difficult to realize the advantageous effect in the canceller process by the interference canceller if the receiving quality of the main path is low, the determining process in the inverse diffusion mode illustrated in FIG. 1 is a determining process whose determination basis is that the receiving quality of the main path is high or low.

First, the HSDPA receiver controlling unit (1022) determines whether or not the fluctuation in time for the path is small based on the information on the propagation channel condition inputted from the path search processing unit (1021) (step S1). Meanwhile, since the HSDPA receiver controlling unit (1022) determines whether or not the fluctuation in time for the path is small based on a threshold which is previously set in the HSDPA receiver controlling unit (1022), when determining that the fluctuation in time for the path is less than the predetermined threshold, the HSDPA receiver controlling unit (1022) determines that the fluctuation in time for the path is small, and when determining that the fluctuation in time for the path is equal to or more than the-predetermined threshold, the HSDPA receiver controlling unit (1022) determines that the fluctuation in time for the path is large.

Meanwhile, since the receiving quality of the main path is low if the fluctuation in time for the path is large, when determining that the fluctuation in time for the path is large (step S1/No), the HSDPA receiver controlling unit (1022) determines to use the conventional receiving method (step S4), and terminates the determining process in the inverse diffusion mode.

When determining that the fluctuation in time for the path is ssmall (step S1/Yes), the HSDPA receiver controlling unit (1022) determines whether or not the number of the paths is small (step S2). Since the HSDPA receiver controlling unit (1022) determines whether or not the number of the paths is small based on a threshold which is previously set in the HSDPA receiver controlling unit (1022), when determining that the number of the paths is less than the predetermined threshold, the HSDPA receiver controlling unit (1022) determines that the number of the paths is small, and when determining that the number of the paths is equal to or more than the predetermined threshold, the HSDPA receiver controlling unit (1022) determines that the number of the paths is large.

Meanwhile, since it is considered that the receiving quality of the main path is high if the number of paths is small, when determining that the number of paths is large (step S2/No), the HSDPA receiver controlling unit (1022) determines to use the conventional receiving method (step S4), and terminates the determining process in the inverse diffusion mode.

When determining that the number of paths is small (step S2/Yes), the HSDPA receiver controlling unit (1022) determines to use the interference canceller (step S3), and terminates the determining process in the inverse diffusion mode.

As described above, by controlling so as to communicate via wireless as separating the interference canceller and the conventional receiving method according to the propagation channel condition, the HSDPA receiver controlling unit (1022) according to the present embodiment becomes able to improve the decode quality by the interference canceller, and also to maintain the same decode quality as that of the case that the conventional receiving method is used even in such a propagation channel condition that the decode quality in the case that only the interference canceller is provided is less than the decode quality in the case that the conventional receiving method is used. Thus, even under the environment of any propagation channel condition, it becomes possible to maintain the decode quality in the case that the conventional receiving method is used, and also, to improve the decode quality by the interference canceller.

[Second Exemplary Embodiment]

Next, a second exemplary embodiment will be described.

Figure 4:
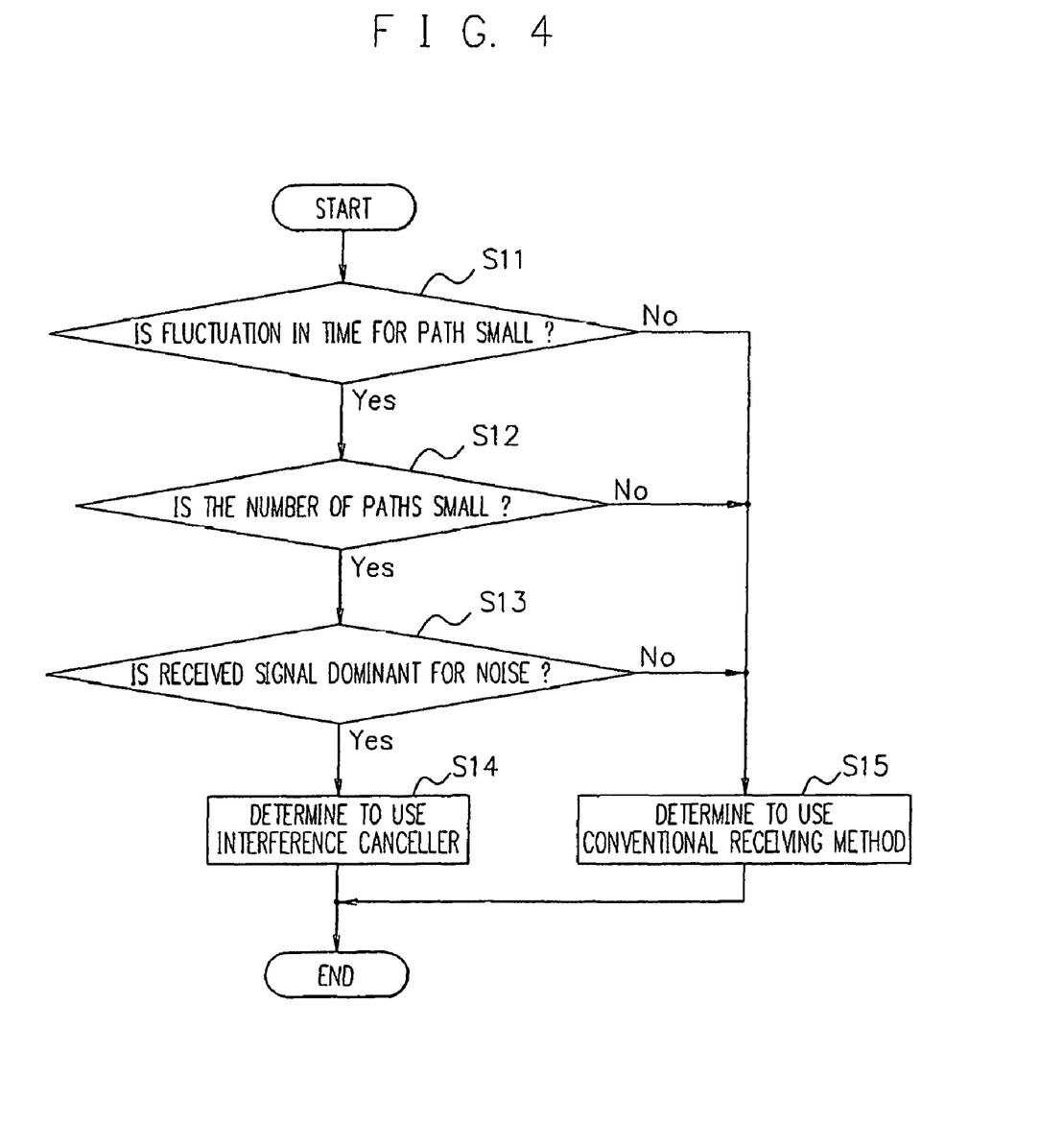
FIG. 4 is a flowchart illustrating the determining process in the inverse diffusion mode executed by the wireless communicating apparatus according to a second exemplary embodiment.

As illustrated in FIG. 1, while it is assumed that the wireless communicating apparatus according to the first exemplary embodiment executes the first determination (step S1) for determining whether or not the fluctuation in time for the path is less than the predetermined threshold, and the second determination (step S2) for determining whether or not the number of the paths is less than the predetermined threshold, and determines (step S3, 4) to use which receiving method of the first receiving method or the second receiving method to communicate via wireless according to the determination result by the first determination (step S1) and the determination result by the second determination (step S1), as illustrated in FIG. 4, the wireless communicating apparatus according to the second exemplary embodiment is characterized by further executing a third determination (step S13) for determining whether or not a ratio of a noise to the received IQ signal is less than a predetermined threshold, and determining (step S14, 15) to use which receiving method of the first receiving method or the second receiving method to communicate via wireless according to the determination results by the first determination result (step S11), the second determination result (step S12), and the third determination result (step S13). Thereby, it becomes possible to execute a more accurate determining process. Hereinafter, the wireless communicating apparatus according to the second exemplary embodiment will be described as referring to FIG. 4.

Figure 3:
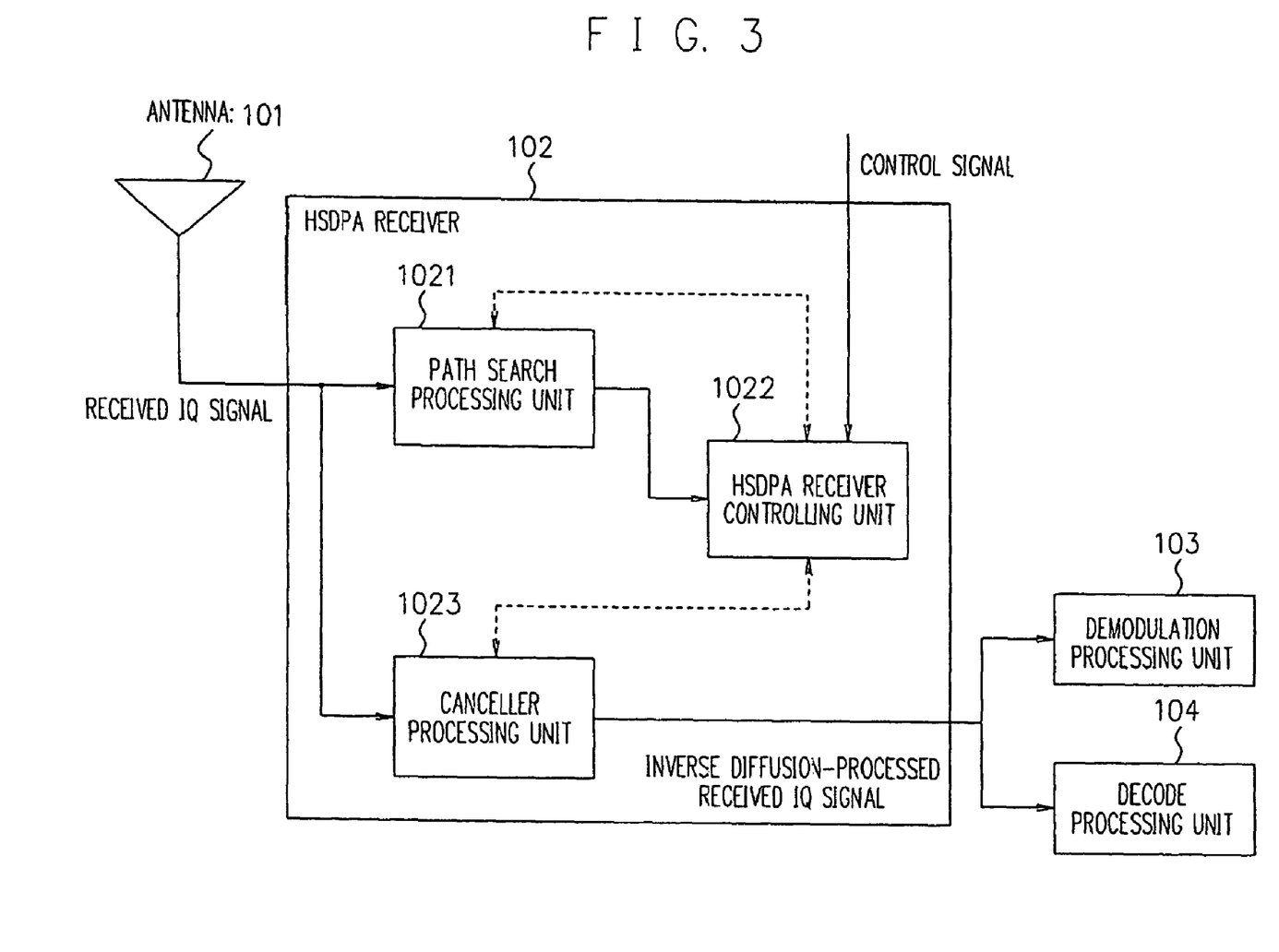
FIG. 3 is a diagram illustrating an internal configuration of the wireless communicating apparatus according to the present embodiment.

Meanwhile, the wireless communicating apparatus according to the second exemplary embodiment estimates the propagation channel condition (the distribution in time for the path, the number of the paths, the ratio of the noise to the received IQ signal) and the path position based on the received IQ signal inputted in the HSDPA receiver (102) in the path search processing unit (1021) illustrated in FIG. 3, and outputs information on the estimated propagation channel condition and path position to the HSDPA receiver controlling unit (1022). Thereby, it becomes possible to execute a determining process in the inverse diffusion mode illustrated in FIG. 4 in the HSDPA receiver controlling unit (1022).

First, the HSDPA receiver controlling unit (1022) executes the first determination (step S11) for determining whether or not the fluctuation in time for the path is small, and the second determination (step S12) for determining whether or not the number of the paths is small based on the information on the propagation channel condition inputted from the path search processing unit (1021) like the determining process in the inverse diffusion mode illustrated in FIG. 1.

When determining that the number of the paths is small (step S12/Yes), the HSDPA receiver controlling unit (1022) determines whether or not the received IQ signal is dominant for the noise (step S13). When determining whether or not the received IQ signal is dominant for the noise, the HSDPA receiver controlling unit (1022) determines based on a threshold previously set in the HSDPA receiver controlling unit (1022), and when determining that the ratio of the noise to the received IQ signal is less than the predetermined threshold, the HSDPA receiver controlling unit (1022) determines that the received IQ signal is dominant for the noise, and when determining that the ratio of the noise to the received IQ signal is equal to or more than the predetermined threshold, the HSDPA receiver controlling unit (1022) determines that the received IQ signal is not dominant for the noise.

Meanwhile, since it is considered that the receiving quality of the main path is high when the received IQ signal is dominant for the noise, when determining that the received IQ signal is not dominant for the noise (step S13/No), the HSDPA receiver controlling unit (1022) determines to use the conventional receiving method (step S15), and terminates the determining process in the inverse diffusion mode.

When determining that the received IQ signal is dominant for the noise (step S13/Yes), the HSDPA receiver controlling unit (1022) determines to use the interference canceller (step S14), and terminates the determining process in the inverse diffusion mode.

As described above, the wireless communicating apparatus according to the second exemplary embodiment further executes the third determination (step S13) for determining whether or not the ratio of the noise to the received IQ signal is less than the predetermined threshold, and determines (step S14, 15) to use which receiving method of the first receiving method or the second receiving method to communicate via wireless according to the determination results of the first determination result (step S11), the second determination result (step S12), and the third determination result (step S13), thereby, executes a more accurate determining process, and in the wireless communicating apparatus provided with the interference canceller which is necessary to receive data whose encoding ratio is high like the HSDPA, even under the environment of any propagation channel condition, it becomes possible to obtain the favorable decode quality which is not less than that of the conventional receiving method.

Meanwhile, the above embodiment is a preferred embodiment of the present invention, the present invention is not limited to the above embodiment, and the present invention can be implemented by applying a variety of modifications without departing from the scope of the concept of the present invention.

For example, in the above embodiments, while each condition is determined based on the threshold which is previously set in the wireless communicating apparatus when executing the determining process in the inverse diffusion mode illustrated in FIG. 1, and FIG. 4, it is also possible to control so as to arbitrarily change the threshold which is used in the determining process in the inverse diffusion mode illustrated in FIG. 1, and FIG. 4.

While it is not described that information of the canceller processing unit (1023) is fed back to the HSDPA receiver controlling unit (1022) in the above embodiments, for example, it is also possible to construct so that the canceller processing unit (1023) estimates the propagation channel condition and the path position like the path search processing unit (1021), and feeds back information on the estimated propagation channel condition and path position to the HSDPA receiver controlling unit (1022), and the HSDPA receiver controlling unit (1022) totally analyzes the information on the propagation channel condition and the path position inputted from the path search processing unit (1021), and the information on the propagation channel condition and the path position inputted from the canceller processing unit (1023), and executes the determining process in the inverse diffusion mode illustrated in FIG. 1 and FIG. 4, and determines the path position.

While the HSDPA has been described in the above embodiments, the wireless communicating apparatus according to the present embodiment is not limited to the HSDPA, and can be applied to another wireless communicating technique if the technique is the wireless signal receiving for the data rate whose encoding ratio is high.

The control operation in the wireless communicating apparatus according to the above present embodiment can be executed not only by a hardware configuration, but also by software such as a computer program, and the above program is recorded in a recording medium such as an optical recording medium, a magnetic recording medium, a magnet-optical recording medium, or a semiconductor, and the above program is read from the recording medium to the wireless communicating apparatus capable of wireless-communicating, thereby, it is also possible to cause the wireless communicating apparatus to execute the above control operation. It is also possible to cause the wireless communicating apparatus to execute the above control operation by causing the wireless communicating apparatus to read the above program from an external device connected through a predetermined network.

Industrial Applicability

The wireless communicating apparatus, the receiving method selecting method, and the receiving method selecting program according to the present invention can be applied to the wireless signal receiving for the data rate whose encoding ratio is high.

DESCRIPTION OF SYMBOLS 1 base station
2 wireless communicating apparatus
3 obstacle
101 antenna
102 HSDPA receiver
103 demodulation processing unit
104 decode processing unit
1021 path search processing unit
1022 HSDPA receiver controlling unit
1023 canceller processing unit

The invention claimed is:

1. A wireless communicating apparatus, provided with at least two receiving methods of a first receiving method that is used in a propagation path environment in which it is necessary to reduce multi-path interference, and a second receiving method that is used in a propagation path environment in which it is not necessary to reduce the multi-path interference, characterized by comprising:

a receiving method determining unit that determines which receiving method of the first receiving method or the second receiving method is to be used to communicate via wireless according to fluctuation in time for the path and the number of the paths;

a first determining unit that determines whether or not fluctuation in time for the path is less than a predetermined threshold; and a second determining unit that determines whether or not the number of the paths is less than a predetermined threshold, wherein the receiving method determining unit determines which receiving method of the first receiving method or the second receiving method is to be used to communicate via wireless according to a determination result by the first determining unit and a determination result by the second determining unit.

2. The wireless communicating apparatus according to claim 1, characterized in that when the determination result by the first determining unit is a determination result that the fluctuation in time for the path is less than the predetermined threshold, and the determination result by the second determining unit is a determination result that the number of the paths is less than the predetermined threshold, the receiving method determining unit communicates via wireless by using the first receiving method.

3. The wireless communicating apparatus according to claim 1, characterized in that when the determination result by the first determining unit is a determination result that the fluctuation in time for the path is equal to or more than the predetermined threshold, or when the determination result by the first determining unit is a determination result that the fluctuation in time for the path is less than the predetermined threshold, and the determination result by the second determining unit is a determination result that the number of the paths is equal to or more than the predetermined threshold, the receiving method determining unit communicates via wireless by using the second receiving method.

4. The wireless communicating apparatus according to claim 1, characterized in that the receiving method determining unit determines which receiving method of the first receiving method or the second receiving method is to be used to communicate via wireless according to a ratio of a noise to a received signal.

5. The wireless communicating apparatus according to claim 4, characterized by further comprising:

a third determining unit that determines whether or not a ratio of a noise to a received signal is less than a predetermined threshold, wherein, when a determination result by the third determining unit is a determination result that the ratio of the noise to the received signal is less than the predetermined threshold, the receiving method determining unit communicates via wireless by using the first receiving method, when the determination result by the third determining unit is a determination result that the ratio of the noise to the received signal is equal to or more than the predetermined threshold, the receiving method determining unit communicates via wireless by using the second receiving method.

6. The wireless communicating apparatus according to claim 1, characterized in that the first receiving method is a receiving method that uses an interference canceller to reduce the multi-path interference, and the second receiving method is a receiving method that uses a lake receiver instead of the interference canceller.

7. A receiving method selecting method, executed by a wireless communicating apparatus, provided with at least two receiving methods of a first receiving method that is used in a propagation path environment in which it is necessary to reduce multi-path interference, and a second receiving method that is used in a propagation path environment in which it is not necessary to reduce the multi-path interference, characterized in that the wireless communicating apparatus executes:

a receiving method determining step for determining which receiving method of the first receiving method or the second receiving method is to be used to communicate via wireless according to fluctuation in time for the path and the number of the paths;

a first determining step for determining whether or not fluctuation in time for the path is less than a predetermined threshold; and a second determining step for determining whether or not the number of the paths is less than a predetermined threshold, wherein, the receiving method determining step determines which receiving method of the first receiving method or the second receiving method is to be used to communicate via wireless according to a determination result by the first determining step and a determination result by the second determining step.

8. The receiving method selecting method according to claim 7, characterized in that when the determination result by the first determining step is a determination result that the fluctuation in time for the path is less than the predetermined threshold, and the determination result by the second determining step is a determination result that the number of the paths is less than the predetermined threshold, the receiving method determining step communicates via wireless by using the first receiving method.

9. The receiving method selecting method according to claim 7, characterized in that when the determination result by the first determining step is a determination result that the fluctuation in time for the path is equal to or more than the predetermined threshold, or when the determination result by the first determining step is a determination result that the fluctuation in time for the path is less than the predetermined threshold, and the determination result by the second determining step is a determination result that the number of the paths is equal to or more than the predetermined threshold, the receiving method determining step communicates via wireless by using the second receiving method.

10. The receiving method selecting method according to claim 7, characterized in that the receiving method determining step determines which receiving method of the first receiving method or the second receiving method is to be used to communicate via wireless according to a ratio of a noise to a received signal.

11. The receiving method selecting method according to claim 10, characterized in that the wireless communicating apparatus executes:

a third determining step for determining whether or not a ratio of a noise to a received signal is less than a predetermined threshold, wherein, when a determination result by the third determining step is a determination result that the ratio of the noise to the received signal is less than the predetermined threshold, the receiving method determining step communicates via wireless by using the first receiving method, when the determination result by the third determining step is a determination result that the ratio of the noise to the received signal is equal to or more than the predetermined threshold, the receiving method determining step communicates via wireless by using the second receiving method.

12. The receiving method selecting method according to claim 7, characterized in that
the first receiving method is a receiving method that uses an interference canceller to reduce the multi-path interference, and
the second receiving method is a receiving method that uses a lake receiver instead of the interference canceller.

13. A non-transitory computer-readable medium storing a receiving method selecting program, characterized by causing a wireless communicating apparatus to execute, the wireless communicating apparatus being provided with at least two receiving methods of a first receiving method that is used in a propagation path environment in which it is necessary to reduce multi-path interference, and a second receiving method that is used in a propagation path environment in which it is not necessary to reduce the multi-path interference,
a receiving method determining process for determining which receiving method of the first receiving method or the second receiving method is to be used to communicate via wireless according to fluctuation in time for the path and the number of the paths;
a first determining process for determining whether or not fluctuation in time for the path is less than a predetermined threshold; and
a second determining process for determining whether or not the number of the paths is less than a predetermined threshold,
wherein the receiving method determining process determines which receiving method of the first receiving method or the second receiving method is to be used to communicate via wireless according to a determination result by the first determining process and a determination result by the second determining process.

14. The non-transitory computer-readable medium storing the receiving method selecting program according to claim 13, characterized in that
when the determination result by the first determining process is a determination result that the fluctuation in time for the path is less than the predetermined threshold, and the determination result by the second determining process is a determination result that the number of the paths is less than the predetermined threshold, the receiving method determining process communicates via wireless by using the first receiving method.

15. The non-transitory computer-readable medium storing the receiving method selecting program according to claim 13, characterized in that
when the determination result by the first determining process is a determination result that the fluctuation in time for the path is equal to or more than the predetermined threshold, or
when the determination result by the first determining process is a determination result that the fluctuation in time for the path is less than the predetermined threshold, and the determination result by the second determining process is a determination result that the number of the paths is equal to or more than the predetermined threshold, the receiving method determining process communicates via wireless by using the second receiving method.

16. The non-transitory computer-readable medium storing the receiving method selecting program according to claim 13, characterized in that
the receiving method determining process determines which receiving method of the first receiving method or the second receiving method is to be used to communicate via wireless according to a ratio of a noise to a received signal.

17. The non-transitory computer-readable medium storing the receiving method selecting program according to claim 16, characterized by causing the wireless communicating apparatus to execute:
a third determining process for determining whether or not a ratio of a noise to a received signal is less than a predetermined threshold,
wherein, when a determination result by the third determining process is a determination result that the ratio of the noise to the received signal is less than the predetermined threshold, the receiving method determining process communicates via wireless by using the first receiving method,
when the determination result by the third determining process is a determination result that the ratio of the noise to the received signal is equal to or more than the predetermined threshold, the receiving method determining process communicates via wireless by using the second receiving method.

18. The non-transitory computer-readable medium storing the receiving method selecting program according to claim 13, characterized in that
the first receiving method is a receiving method that uses an interference canceller to reduce the multi-path interference, and
the second receiving method is a receiving method that uses a lake receiver instead of the interference canceller.

19. A wireless communicating apparatus, provided with at least two receiving methods of a first receiving method that is used in a propagation path environment in which it is necessary to reduce multi-path interference, and a second receiving method that is used in a propagation path environment in which it is not necessary to reduce the multi-path interference, characterized by comprising:
receiving method determining means for determining which receiving method of the first receiving method or the second receiving method is to be used to communicate via wireless according to fluctuation in time for the path and the number of the paths;
a first determining unit that determines whether or not fluctuation in time for the path is less than a predetermined threshold; and
a second determining unit that determines whether or not the number of the paths is less than a predetermined threshold,
wherein the receiving method determining unit determines which receiving method of the first receiving method or the second receiving method is to be used to communicate via wireless according to a determination result by the first determining unit and a determination result by the second determining unit.

* * * * *